(12) United States Patent
Beach et al.

(10) Patent No.: US 7,966,045 B2
(45) Date of Patent: *Jun. 21, 2011

(54) WLAN COMMUNICATIONS SYSTEM

(75) Inventors: Robert Beach, Los Altos, CA (US);
Ramesh Sekhar, San Jose, CA (US);
Wanda Sealander, Bedford, NH (US)

(73) Assignee: Symbol Technologies, Inc., Holtsville, NY (US)

( * ) Notice: Subject to any disclaimer, the term of this patent is extended or adjusted under 35 U.S.C. 154(b) by 323 days.

This patent is subject to a terminal disclaimer.

(21) Appl. No.: 12/135,618

(22) Filed: Jun. 9, 2008

(65) Prior Publication Data
US 2009/0009585 A1    Jan. 8, 2009

Related U.S. Application Data

(63) Continuation of application No. 10/680,022, filed on Oct. 7, 2003, now Pat. No. 7,400,912.

(60) Provisional application No. 60/417,731, filed on Oct. 10, 2002.

(51) Int. Cl.
*H04B 1/16* (2006.01)
*H04B 1/38* (2006.01)

(52) U.S. Cl. .................. 455/574; 455/343.1; 455/343.5

(58) Field of Classification Search .................. 455/574, 455/343.1, 343.5, 343.6
See application file for complete search history.

(56) References Cited

U.S. PATENT DOCUMENTS

| | | | |
|---|---|---|---|
| 5,666,355 A | | 9/1997 | Huah et al. |
| 6,069,887 A | * | 5/2000 | Geiger et al. ................ 370/338 |
| 6,931,267 B2 | * | 8/2005 | Darabi .......................... 455/574 |
| 7,236,810 B1 | * | 6/2007 | Underbrink et al. .......... 455/574 |
| 7,395,098 B2 | * | 7/2008 | Darabi .......................... 455/574 |
| 7,536,167 B2 | * | 5/2009 | Gollnick et al. ........... 455/343.4 |

FOREIGN PATENT DOCUMENTS

| | | |
|---|---|---|
| JP | 6120923 A | 4/1994 |
| WO | 95/27342 A1 | 10/1995 |
| WO | 01/20841 A1 | 3/2001 |
| WO | 02/35863 A2 | 5/2002 |

OTHER PUBLICATIONS

First Office Action for Japanese Application Serial No. 2005-501159 mailed Mar. 10, 2009, a foreign counterpart of U.S. Appl. No. 12/135,618.
Applicant's English translation of First Office Action for Japanese Application Serial No. 2005-501159 mailed Mar. 10, 2009, a foreign counterpart of U.S. Appl. No. 12/135,618.
Wireless LAN Medium Access Control (MAC) and Physical Layer (PHY) Specification, ANSI/IEEE Std 802.11, IEEE, 1, 999, 79, 128-136.
EPC Office Action to corresponding Application No. 03770725.4, mailed Mar. 8, 2011—6 pages.

* cited by examiner

*Primary Examiner* — Tilahun Gesesse

(57) ABSTRACT

A wireless local area network audio and video communication system with mobile units is provided, wherein mobile units are operated in a power saving mode and become active at selected intervals corresponding to the duration of audio and video signals forming audio and video data packets. In a preferred arrangement the mobile units have a digital signal processor that operates at different clock rates during different portions of the intervals.

14 Claims, 2 Drawing Sheets

WLAN COMMUNICATIONS SYSTEM

REFERENCE TO RELATED APPLICATIONS

Priority Claim

This application is a Continuation application of U.S. patent application Ser. No. 10/680,022 filed on Oct. 7, 2003 now U.S. Pat. No. 7,400,912 entitled "WLAN Communications System", which claims the priority to the U.S. Provisional Application Ser. No. 60/417, 731, entitled "WLAN Communications System," filed Oct. 10, 2002. The entire disclosure of the prior applications is considered as being part of the disclosure of the accompanying application and hereby expressly incorporated by reference herein.

BACKGROUND OF THE INVENTION

This invention relates to wireless data communication systems and particularly to such systems which may be used for wireless voice, audio or video communication, such as for telephone service, walkie-talkie, museum guides, live video, and the like.

Devices have been known for providing audio signals over a wireless data communications system. In a prior application Ser. No. 09/715,926, filed Nov. 17, 2000, the specification of which is incorporated herein by reference, the present inventor has described a system for providing simplified mobile units that provide voice communication and can also provide voice activation and operation of a remote computer.

One problem associated with all wireless data communication systems is the duration of battery life of mobile units. Typically, a trade-off is required between device size and weight and battery life. Various components of a wireless mobile unit providing communications contribute to the use of power and shortened battery life. It is well-known that it is desired that a system operate over an extended period of time, for example, at least an 8 hour working shift, and accordingly it is an object of the invention to provide a method of operation and a mobile unit for wireless communications over a wireless data communication system that provides low power consumption and long battery life.

SUMMARY OF THE INVENTION

The present invention is a method for use in a wireless data communication system wherein mobile units associate with access points for data communications therewith. One such system is IEEE Standard 802.11. The data communication system operates according to a protocol wherein the mobile units are arranged to conserve power by signaling an associated access point that the mobile unit is entering a power save mode. The associated access point buffers data packets for the mobile unit in power save mode, until it receives a polling message from the corresponding mobile unit. The method is for communicating representative data between a mobile unit and an associated access point. The method includes signaling the associated access point that the mobile unit is in a power save mode. The transmitter and the receiver of the mobile unit are powered down at intervals corresponding to a selected period of time corresponding to the duration of audio or video signals forming an audio or video signal data packet. Data is accumulated in the mobile unit for a time interval corresponding to the selected period of time and used to form transmit data packets. Audio or video representative receive data packets are buffered at the access point. The mobile unit transmitter and receiver are powered up for communication with the associated access point for a communication session. The communication sessions occur at intervals corresponding to the selected period of time and include communicating accumulated transmit data packets and buffered received data packets corresponding to audio and video data between the mobile unit and the associated access point.

The communication sessions may include transmitting a polling message from the mobile unit to the access point. The mobile unit preferably initiates a communication session when it has processed a transmit data packet for communication to the access point. The mobile unit may include a signal in the communication session that the mobile unit is no longer in power save mode. At the conclusion of the communication session the mobile unit signals the access point that it has entered the power save mode. The mobile unit may include a processor arranged to operate at more than one clock rate, wherein the processor is operated at a lower clock rate during a selected period of the time interval. The processor may be programmed to compress accumulated audio and video data and operate at a first or lower clock rate during at least a portion of the time period to accumulate audio and video data and operate at a second higher clock rate to compress the accumulated data. The processor may likewise be programmed to decompress received audio and video data packets and be operated at the second higher clock rate to decompress the received audio and video data packets. The processor may be arranged to parse the received packet and the processor be operated at the second higher clock rate to parse the received packet. The processor may be programmed to store received data packets in at least one buffer and, where the mobile unit receives quadrature components of signals from the access point, the quadrature components may be stored in first and second buffers.

In accordance with the invention there is provided a mobile unit for providing audio communications in a wireless data communication network wherein data is transmitted from access points to mobile units in data packets. The mobile unit includes a receiver for receiving radio signals including audio data packets from the access point. The audio data packets correspond to a selected period of audio information. The mobile units include a transmitter for transmitting signals to the access point. The mobile unit further includes a processor for processing audio data packets and for providing audio output data, and a digital-to-analog converter and audio output circuit for providing output audio corresponding to the audio data packets. The data processor is programmed to control operation of the transmitter and receiver and to periodically power down the transmitter and receiver for selected time intervals at a period corresponding to the selected period of audio information.

The mobile unit processor may be arranged to cause the transmitter to transmit a polling signal to the access point at the period corresponding to the selected period of audio information. The processor may operate at more than one clock rate and be operated at a lower clock rate during second time intervals which are a selected portion of the selected period. The processor may be programmed to decompress the received audio data packets and the processor may be programmed to operate at a higher clock rate to decompress the received audio data packets. The processor may be programmed to parse the received packet and the processor may operate at the higher clock rate to parse received packets. The processor may be programmed to store received data packets in at least one buffer, and where the mobile unit receiver receives quadrature components of signals from the access point, the quadrature component signals may be stored in first and second buffers.

In accordance with the invention there is provided a mobile unit for providing audio communications in wireless data communications network wherein data is transmitted between access points and mobile units in data packets. The mobile unit includes an audio circuit for providing an audio output in response to supplied audio digital signals and for providing digital output signals in response to audio input. A receiver is provided for receiving radio signals including audio data packets from the access point. The audio data packets correspond to a selected period of audio information. A transmitter is provided for transmitting signals to the access point. A processor is provided for processing received audio data packets received by the receiver and for providing audio digital signals to the audio circuit corresponding thereto. The processor is further arranged to receive digital output signals from the audio circuit and provide transmit audio data packets to the transmitter. The processor is programmed to control operation of the transmitter and receiver and to periodically power down the transmitter and receiver for selected time intervals at a period corresponding to the selected period of audio information.

In a preferred arrangement the processor is arranged to cause the transmitter to transmit a polling signal to the access point at the period corresponding to the selected period of audio information. The processor may further be arranged to operate at first and second clock rates, wherein the processor is operated at a lower clock rate during second intervals which are a selected portion of the time period.

In a further preferred embodiment the processor is programmed to compress the digital output signals and the processor is programmed to operate at the second higher clock rate to compress the digital output signals. Where the processor is programmed to decompress received data packets the processor is programmed to operate at the second higher clock rate to decompress the received data packets. The processor may also be programmed to parse the received packets and to operate at the second higher clock rate to parse the received packets. The processor may further be programmed to store received data packets in at least one data buffer. Where the mobile unit receives quadrature components of signals from the access point, the quadrature signals may be stored in first and second buffers.

It will be understood that the present invention may be used for communication of data other than audio, including video. For a better understanding of the present invention, together with other and further objects, reference is made to the following description, taken in conjunction with the accompanying drawings, and its scope will be pointed out in the appended claims.

DETAILED DESCRIPTION OF THE PREFERRED EMBODIMENTS

Figure 1:
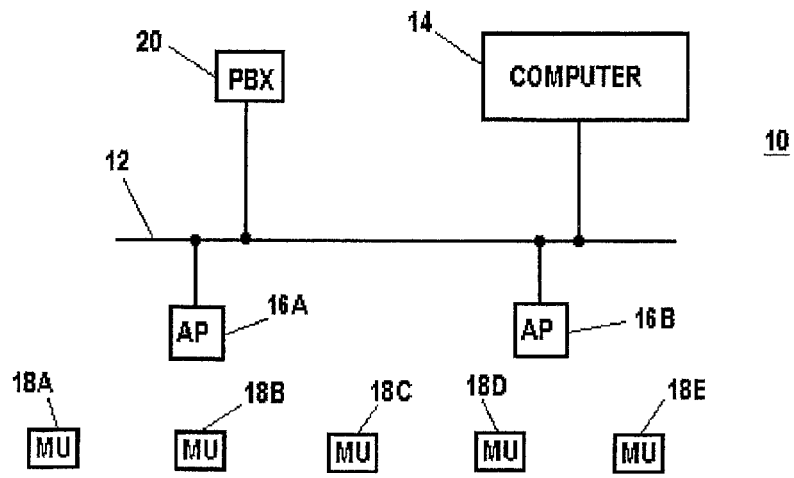
FIG. 1 is a block diagram representing a wireless local area network in which the method of the present invention may be practiced.

FIG. 1 is a block diagram illustrating a wireless local area network 10 for providing data communications between a wired network 12 which includes a computer 14 and mobile units 18A through 18E which communicate by wireless data communications with access points, such as access points 16A and 16B which are connected to network 12. Network 12 may also include a PBX 20 for providing telephone communications to other units outside of the network through the public telephone system. Wireless local area network 10 may be used in a variety of applications. In accordance with the present invention, wireless network 10 is used to provide audio communications between mobile units 18 and computer 14 or other units using PBX 20. The applications for the audio communications may include telephone communication among mobile unit 18, telephone communications with others connected to network 12, telephone communications outside of network 12 via PBX 20, walkie-talkie type communications between mobile units 18, and other applications which involve only a single direction of wireless communication, such as providing mobile units 18 for listening to audio tour information in a museum or art gallery, or using mobile units 18 for previewing recorded music in a music store.

In connection with providing the largest variety of applications it is an object of the present invention to provide a simple and inexpensive mobile unit 18. It is an additional object to provide a mobile unit 18 which is extremely light weight and which has a large operating time without battery recharge.

The inventors have reviewed the power consumption requirements of a conventional mobile unit, and have arrived at methods of operation of the mobile unit and a configuration for the mobile unit which provides for increased battery time period while maintaining compatibility with commonly used standards for wireless local area networks, such as IEEE Standard 802.11. In connection with IEEE Standard 802.11, there is provided an operation mode wherein mobile units can save power by powering down the transmitter and receiver for selected periods of time. In the power saving mode of Standard 802.11, mobile units generally power down for a period of 100 ms. During the 100 ms interval when the mobile units are powered down, the access point with which the mobile unit is associated stores data communication packets directed at the mobile unit until it receives a polling signal from the mobile unit indicating that the mobile unit has powered up and is ready to receive data packets. In addition when the mobile unit is required to send a packet it can activate the power up, and signal the access point that it is in an active condition and thereafter send packets to the access points. One problem associated with using the power save mode for the mobile unit, when the mobile units are engaged in active telephone communications or other audio communications is that the voice encoded data packets sent and received by the mobile units usually encompass only 20-40 ms of voice or other audio data. Accordingly, if a mobile unit enters a normal IEEE Standard 802.11 power saving mode during an ongoing audio communication, and the mobile unit waits 100 ms for sending a polling signal to the access point to cause the access point to download accumulated data packets, there will be an interruption in the continuity of the audio packets as presented to the user of the mobile unit, since the packets encompass only 20-40 ms of audio data each.

The present invention overcomes the deficiencies in the standard power saving mode for mobile units by forcing the mobile units to operate in a power saving mode which has a time period set according to the time period of audio packets which are transmitted and received.

Figure 2:
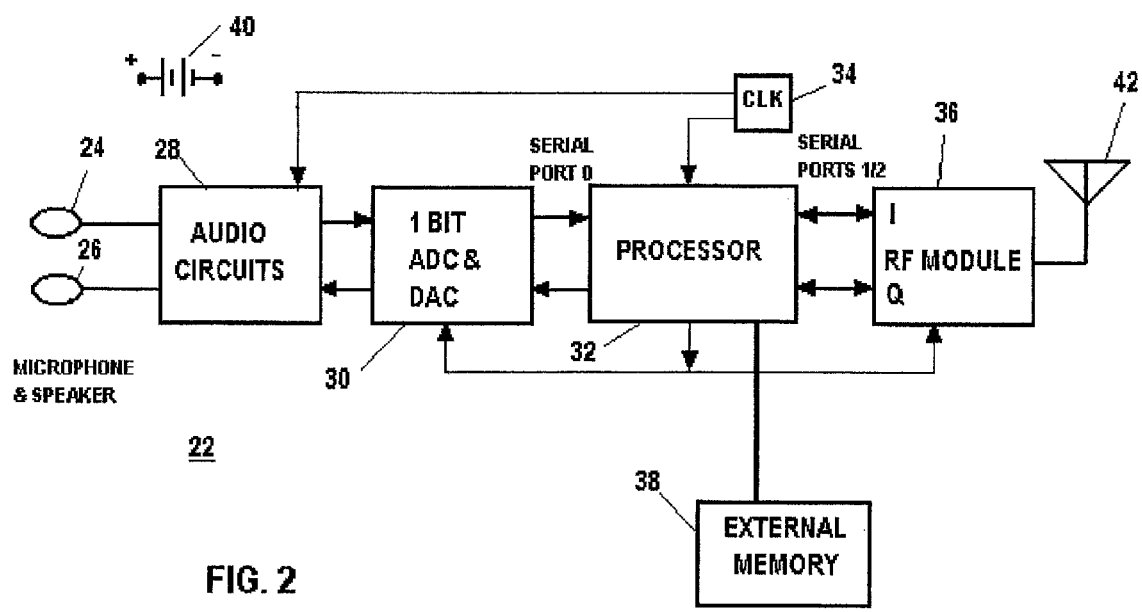
FIG. 2 is a block diagram of an improved mobile unit for a wireless local area network in accordance with the present invention.
Figure 3:
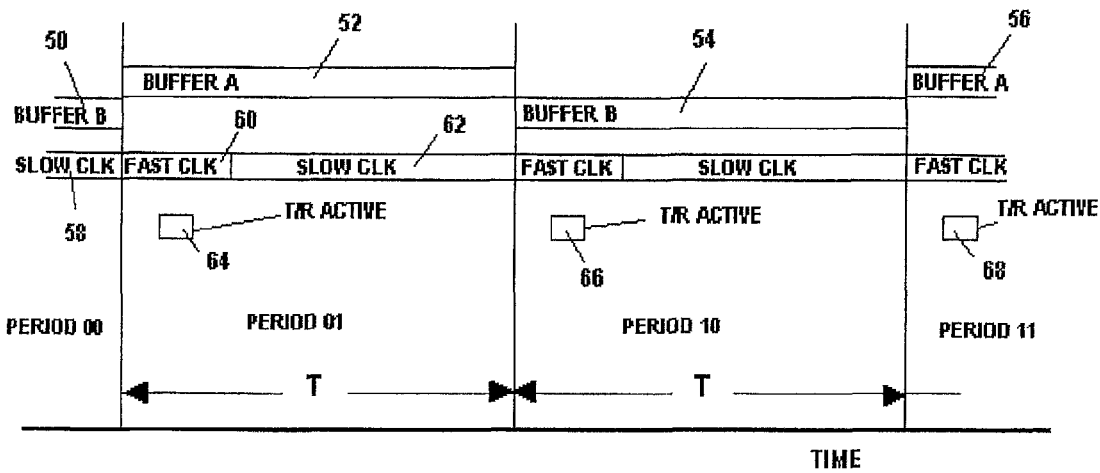
FIG. 3 is a time diagram illustrating the operation of the mobile unit of FIG. 2 in accordance with a preferred arrangement of the present invention.

FIG. 3 is a diagram illustrating operations of a mobile unit following the method of the present invention. The operation is a sequence of time periods T which correspond to the time period of an audio packet used in the communication system. Typically this time period will be in the range of 20 to 40 ms. During a first time period 01 voice data received by a microphone 24 of the mobile unit 22 via audio circuits 28 is converted to digital data in a converter 30, shown in FIG. 2. The voice data is received by processor 32 and stored in a buffer portion of a memory 38 during a first buffer period labeled buffer A 52 in FIG. 3. At the conclusion of the first time period 01 the processor continues to receive audio data and stores the next interval of audio data 54 in a second buffer, buffer B in external memory 38. During the second period 10, the mobile unit processor is activated to compress and transmit an audio packet corresponding to the audio data in buffer A to the associated access point. Current audio data is meanwhile being stored in buffer B.

During most of each time period T, processor 32 shuts down the circuits of RF module 36 to thereby conserve power. During an initial portion of each time period processor 32 compresses the data which has been accumulated in the buffer during the preceding time period T, and activates the transmitter for transmission of a data packet. The transmitter is activated during a T/R active interval 64, 66, 68 which comprises approximately 2-4 ms and is generally only about 10% of the time period T. After the previously accumulated data packet is compressed, the processor 32 operates the RF module 36 for the T/R active interval to transmit and receive signals using antenna 42.

FIG. 4 illustrates various portions of four different transmit/receive arrangements, according to different embodiments of the method of the present invention. In the FIG. 4A embodiment of the method, the transmit/receive active period includes a first interval 70 wherein the RF module, under control of processor 32 transmits a polling signal to the access point. An acknowledgment 72 of the polling signal is thereafter received from the access point. The polling signal causes the access point to transmit any accumulated packets destined to the mobile unit, herein called receive packets 74, to the mobile unit. During interval 76 the mobile unit acknowledges the receive packets to the access point. The mobile unit thereafter during interval 78 transmits a transmit packet, comprising the compressed audio data it has received from the buffer which was accumulated during the prior time period T, to the access point. An acknowledgement from the access point is received during interval 80. Following the sequence 64A shown in FIG. 4A, the processor 32 powers down the RF module until the next transmit packet has been prepared for transmission by the processor 32. Accordingly, the transmit/receive module is powered off approximately 90% of the time to thereby conserve battery power, reducing battery weight and/or increasing active operational time for the mobile unit.

It should be understood in connection with the timing diagrams of FIG. 3 and FIG. 4 that the processor must provide sufficient time prior to the active transmissions and receptions to allow the RF module 36 to go through a power up sequence. This typically takes about 1 ms in modern available RF modules.

Figure 4A:
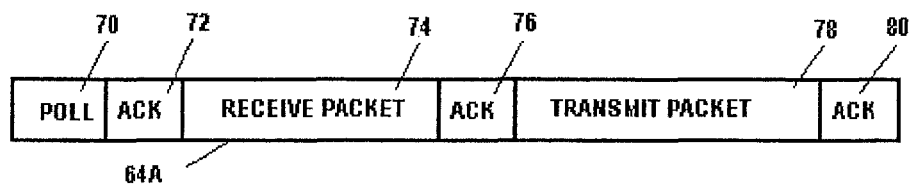
FIGS. 4A, 4B, 4C and 4D illustrate various alternate transmission and receiving sequences which may be used in connection with the timing diagram of FIG. 3 for practicing the method of the present invention.

In connection with the embodiment of the method illustrated in FIG. 4A the mobile unit has previously signaled the access point that it is in the power save (PSP) mode. Accordingly, during intervals between the transmit/receive active state, the access point buffers packets destined to the mobile unit until it receives the polling signal 70 from the mobile unit.

Figure 4B:
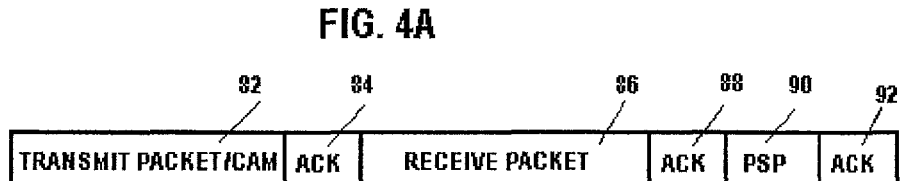

FIG. 4B shows an alternate operational arrangement in accordance with the invention. The mobile unit operates similarly to accumulate audio representative data 52, 54 in buffers A and B and to power up the transmitter/receiver during periods 64, 66, 68 to transmit the previously accumulated audio data as a transmit packet and to receive an audio data packet from the access point during the transmitter/receiver active time period. In the method arrangement of FIG. 4B the mobile unit is in the power save mode while the transmitter/receiver is inactive. During a first time interval 82 in the method of FIG. 4B the RF module 36 is operated by processor 32 to transmit the accumulated and compressed audio data packet to the access point along with a signal indicating that the mobile unit is no longer in the power save mode but has gone to the communications active (CAM) mode. During interval 84 the access point sends an acknowledgement to the mobile unit and thereafter transmits any audio receive packet 86 or other packet that is destined to the mobile unit that has been buffered in the access point. During time interval 88 the mobile unit sends an acknowledgment of the receive packet and thereafter sends a message 90 indicating that it is entering the power save mode. The access point acknowledges message 90 during interval 92. Accordingly, in the method as illustrated in FIG. 4B the mobile unit is constantly switched between the PSP and CAM modes of operation. This method likewise achieves approximately a 90% savings in the active time period for the RF module thereby conserving battery energy in the mobile unit.

The embodiments of the method illustrated in FIGS. 4A and 4B involve six intervals consisting of either a transmission or reception by the mobile unit. The methods of FIGS. 4C and 4D illustrate practice of the invention according to methods that are slightly modified from Standard 802.11, but which enable the number of transmission or reception intervals to be reduced to four.

Figure 4C:
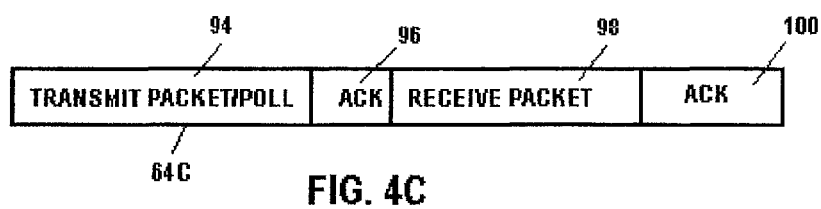

In the embodiment illustrated in FIG. 4C during a first time interval 94 the mobile unit transmits the previously accumulated and compressed audio data packet and also includes within the transmission, data which indicates that it is polling the access point. The access point acknowledges the transmit packet during interval 96 and transmits the received packet to the mobile unit during interval 98 which is acknowledged during interval 100.

In the embodiment of FIG. 4D, which is again a minor modification from Standard 802.11 the mobile unit during interval 102 sends a transmit packet and data indicating to the access point that it has entered communications active mode. The acknowledgment is provided during interval 104. A received packet is transmitted to the mobile unit during interval 106 and during a final interval 108 the mobile unit sends a combination signal to the access point acknowledging the received packet and signaling that it is entering power save mode.

Figure 4D:
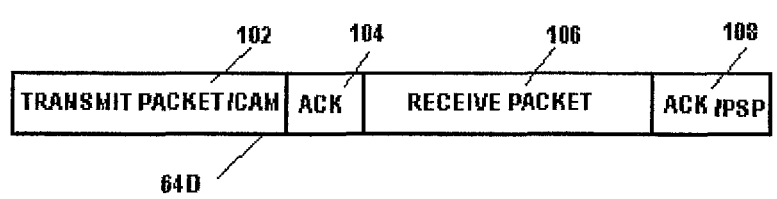

The embodiments of the method of FIGS. 4C and 4D require that the access point have additional software functionality to handle the combined messages which are not in Standard 802.11 protocol. However, this can be provided as an overlay to a Standard 802.11 system, which provides compatible 802.11 communications with other mobile units.

As thus far described, the mobile unit is enabled to conserve the energy of its battery 40 by selectively operating the RF module 36 only for periods during which transmissions and receptions are required. In connection with receive signals the processor preferably accumulates a received audio packet in a receive buffer in external memory 38 as the packet is received from the access point. After completion of the communications the receive packet is decompressed and provided to audio circuits 28 by converter 30 for providing an output signal to the speaker 26.

In one embodiment there may be provided first and second receive buffers for receiving separate in-phase and quadrature-phase signals provided by RF module 38. The processor can examine those signals during the parsing process and select the buffered signal provided in the separate I and Q buffers in memory 38 to decide which signal has the best signal digital quality, and use that signal in the further processing of the received signal.

The inventors has recognized that higher speed operation of processor 32 is required only during the process of compressing transmit packets, operating RF module 36 and parsing received packets. The further operation of the processor to receive and buffer audio data from the audio circuit 28 or to provide audio output signals to the audio circuit 28 do not require the full capacity of modern digital signal processors such as the TI 5409 digital signal processor, which operates at a peak rate between 50 and 100 MHz. This exemplary digital signal processor has the capability to conserve battery energy by switching to a lower clock rate. Accordingly, as shown in FIG. 2 the mobile unit may be provided with a clock 34 which provides two or even three clock rates to the digital signal processor and A to D converter 30 during various portions of the time period T, as shown by clock rates 60 and 62 in FIG. 3. For example, a clock rate of about 80 MHz can be provided for high speed processor operation for purposes of audio compression or decompression and parsing of received packets. A slower clock rate of about 3 MHz can be provided for low speed operation when the digital signal processor is in the process of receiving and buffering audio data or providing output audio data to the audio circuits 28. An intermediate clock rate of about 22-23 MHz can be used when the processor is transferring data packets to or from the radio Accordingly, processor 32 is operated at a higher clock speed for performing audio data packet compression, for providing 802.11 functions such as roaming, packet processing, association, CRC, WEP, channel access, and so forth, and operates at a slower clock rate during the period 62, when performing only audio signal processing by receiving and/or sending audio data to and from the audio circuits 28.

The RF module 36 may be an 802.11 unit available from Maxim Integrated Circuits. In the configuration of FIG. 2 the base band function of the 802.11 communications which are not handled by the radio are handled in processor 32. For this reason received I and Q data streams are provided to the processor by radio 38. Alternately, the radio module can be arranged to perform baseband processing, and only one serial connection between the processor and the radio module is required.

Data rates of 1 or 2 Mbit can be supported. The audio data processing in processor 32 will include compression and decompression, using for example G.729 compression, protocol, buffering for received protocol support and support for the 1 bit ADC/DAC unit. The processor may also receive user interface control such as 1 or 2 buttons and volume control. No visual display is required. The connectivity of the mobile unit is controlled by the network 12 including the computer 14.

In connection with the voice transmission process, the converter circuit 30 turns n-log voice signals into a serial bit stream. These streams are handled by the serial port and DMA units in the processor 32 and are stored in the memory 38. While this process is ongoing the processor 32 operates at the low clock rate consuming a few hundred microamps. When the desired number of bytes is received, typically 20 to 40 ms worth, the DMA unit will wake up the main DSP processor and switch it to a higher speed, higher rate clock operation. This process takes a few dozen microseconds. The DMA unit will automatically switch to another buffer, between buffer A and buffer B without processor intervention. The processor then compresses the voice data using G.729 or some other algorithm. Some conversion may be necessary from the format generated by the 1 bit analog-to-digital converter. At 100 MIPS this process will take about 1.5 ms per 10 ms voice sample. Once this is done the 802.11, IP, UDP and RTP headers will be added to the packet, and it may be encrypted as desired. Once the packet is ready, the base band functions will be performed by the processor to transform the packet into a form that can be provided to the RF module by the other serial port of the signal processor.

The Maxim Integrated Circuits requires only a few dozen microseconds for the start-up process so that it can actually be started quite late in the process. Once the packet has been sent, the processor will turn the radio around to handle the receive. During this time wave samples will continue to arrive by the other serial port. The digital signal processor will start looking for the preamble and SFD. Some indication of the preamble should arrive with the FIFF, time or the search will be abandoned. If the SFD is received, then the processor will receive the packet and perform the base band processing to turn the packet in data bits. Once the acknowledgment has been received, the radio will be turned off and the digital signal processor will focus on analyzing the packet at the MAC layer. An acknowledgment will complete the transmit operation. If the acknowledgment does not appear the processor will need to retransmit the packet. It can use the previously used data for the retransmission. Packet reception is performed immediately after the packet transmission process is done by issuing a poll packet to the access point. Poll packets can be precalculated and sent to the access point via the mechanism outlined above. The digital signal processor only has to look for data packets during the poll response period. Receiving data packets is similar to that for receiving acknowledgments. In receiving the data packets, however, the processor must receive the PLCP header and check the rate field to make sure the packet is a one or two Mbit. If the packet is a 5.5 or 11 Mbit packet, it is ignored. When the packet is received at the base band level and verified that it is good at the MAC layer, an acknowledgment packet is generated. This packet is precalculated and can be sent without any additional processing. When the received packet is ready, it is parsed to locate the voice data within it. It is loaded into the jitter buffer and it is decompressed later.

The received base band processing includes two phases. First is detection of the SFD and the selection of the best correlation stream. Second it the actual data bit extraction. The first phase is handled by using the two serial ports interfaced through the radio. One serial port receives the in-phase line, the other quadrature phase line. Both serial ports are clocked by a 44 MHz signal. The data is stored in parallel buffers. The DMA units for each serial port operate as circular buffers. These are large enough to contain enough samples so that when the processor falls behind in preamble/SFD processing, none of the data is lost. During the SFD detection phase the processing consists of taking 8 bits of samples and doing a table lookup to yield two 4 bit values. The stream of these 4 bit values is divided into four sub-streams and each is correlated, descrambled and searched for the SFD. Eventually the SFD will be found on several of the streams and the buffered stream with the best correlation will be used as the data source. Once the best stream has been selected the processing burden is reduced.

While there have been described what are believed to be the preferred embodiments of the present invention, those skilled in the art will recognize that other and further changes may be made thereto without departing from the spirit of the invention, and it is intended to claim all such changes and modifications as fall within the true scope of the invention. It will be understood that the present invention may be used for communication of various types of data, including video data.

We claim:

1. A method of operating a mobile unit in communication with an access point, comprising:
   receiving one of an audio signal from an audio circuit of the mobile unit and a video signal from a video circuit of the mobile unit;
   converting the one of the audio signal and the video signal into at least one digital packet;
   powering down an RF module of the mobile unit for a first time period corresponding to a time period for converting the at least one digital packet;
   accumulating the converted digital packets in the mobile unit;
   activating the RF module for a second time period that is a fraction of the first time period; and
   transmitting the accumulated packets to the access point during the second time period.

2. The method of claim 1, wherein converting includes compressing the packets.

3. The method of claim 1, further comprising:
   during the second time period, receiving from the access point packets of one of audio and video information.

4. The method of claim 3, wherein the packets received from the access point were buffered at the access point during the first time period.

5. The method of claim 1, further comprising:
   operating a processor of the mobile unit by varying a clock rate of the processor so that a first clock rate is used for the first time period and a second clock rate is used for the second time period, wherein the first clock rate is faster than the second clock rate.

6. The method of claim 1 wherein the first time period includes an association operation.

7. A system of operating a mobile unit in communication with an access point, comprising:
   means for receiving one of an audio signal from an audio circuit of the mobile unit and a video signal from a video circuit of the mobile unit;
   means for converting the one of the audio signal and the video signal into at least one digital packet;
   means for powering down an RF module of the mobile unit for a first time period corresponding to a time period for converting the at least one digital packet;
   means for accumulating the converted digital packets in the mobile unit;
   means for activating the RF module for a second time period that is a fraction of the first time period; and
   means for transmitting the accumulated packets to the access point during the second time period.

8. The system of claim 7, wherein the means for converting includes means for compressing the packets.

9. The system of claim 7, further comprising:
   means for, during the second time period, receiving from the access point packets of one of audio and video information.

10. The system of claim 9, wherein the packets received from the access point were buffered at the access point during the first time period.

11. The system of claim 7, further comprising:
    means for operating a processor of the mobile unit by varying a clock rate of the processor so that a first clock rate is used for the first time period and a second clock rate is used for the second time period, wherein the first clock rate is faster than the second clock rate.

12. The system of claim 7, wherein the first time period includes an association operation.

13. A method of operating a mobile unit, comprising:
    operating a processor of the mobile unit at a first clock rate during a first time period where one of an audio signal from an audio circuit of the mobile unit and a video signal from a video circuit of the mobile unit are converted into at least one digital packet;
    causing the processor to power down an RF module during the first time period and accumulate the converted digital packets;
    operating the processor of the mobile unit at a second clock rate during a second time period that is a fraction of the first time period and where the RF module is activated for transmitting the accumulated packets; and
    wherein the first clock rate is greater than the second clock rate.

14. The method of claim 13, wherein the first time period includes a compression operation.

* * * * *